Figure 1:
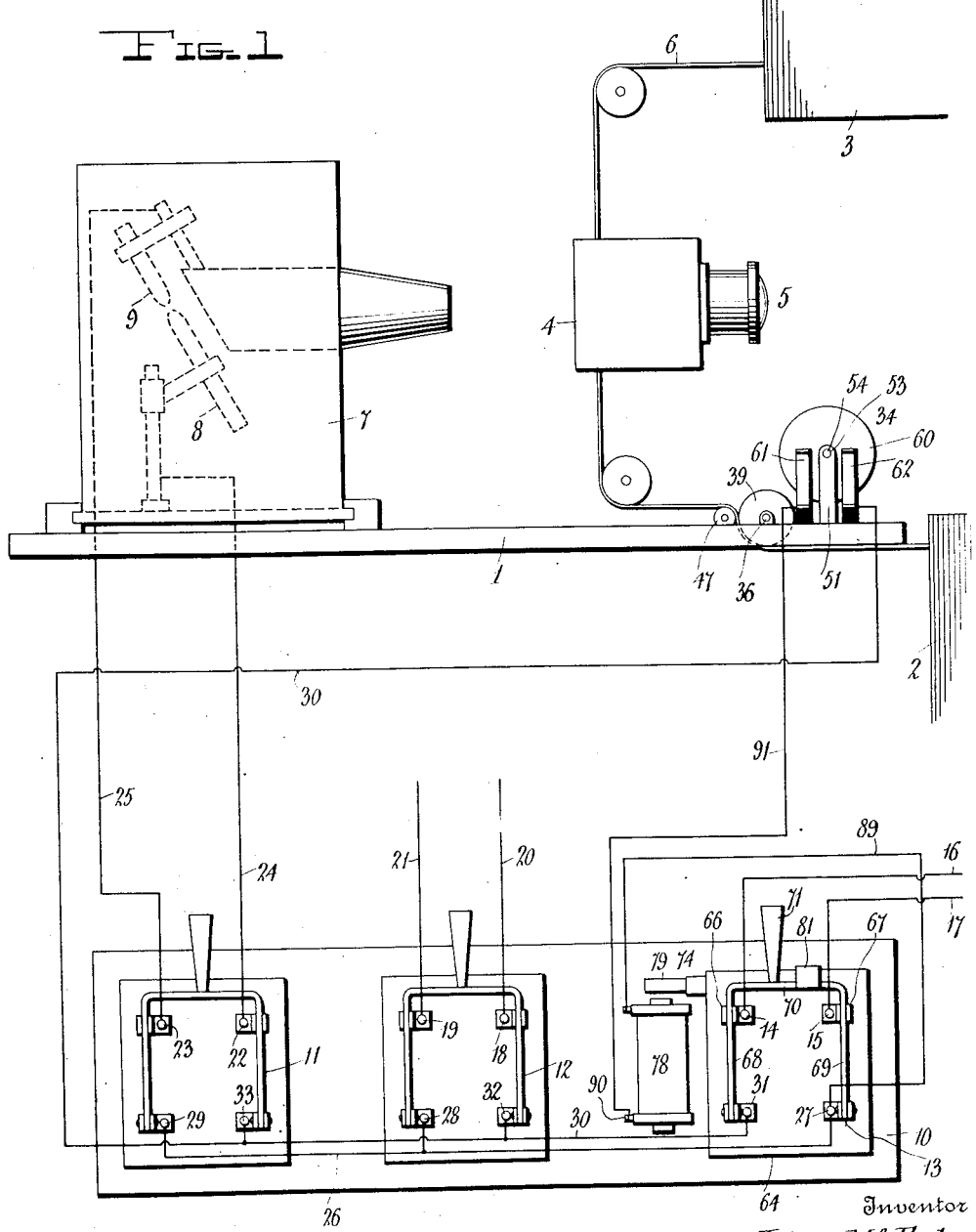

J. McFEELY.
AUTOMATIC CONTROL AND SAFETY DEVICE FOR MOVING PICTURE MACHINES.
APPLICATION FILED MAY 23, 1911.

1,084,651.

Patented Jan. 20, 1914.
3 SHEETS—SHEET 1.

Witnesses

Inventor
John McFeely
By
Attorneys

J. McFEELY.
AUTOMATIC CONTROL AND SAFETY DEVICE FOR MOVING PICTURE MACHINES.
APPLICATION FILED MAY 23, 1911.
1,084,651.
Patented Jan. 20, 1914.
3 SHEETS—SHEET 2.
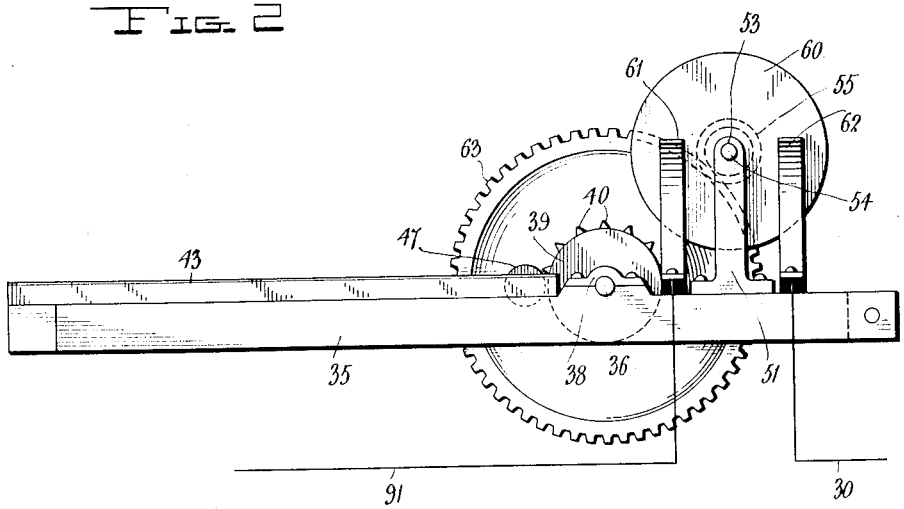
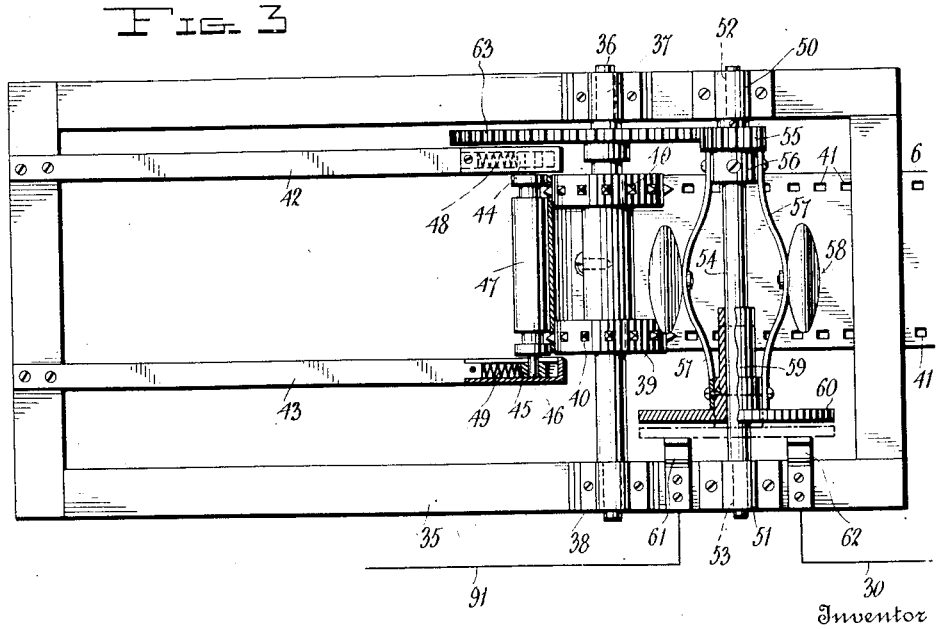
Inventor
John McFeely

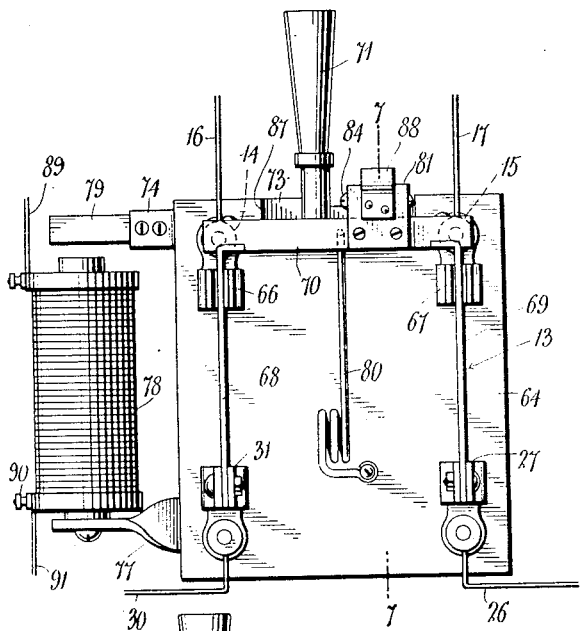
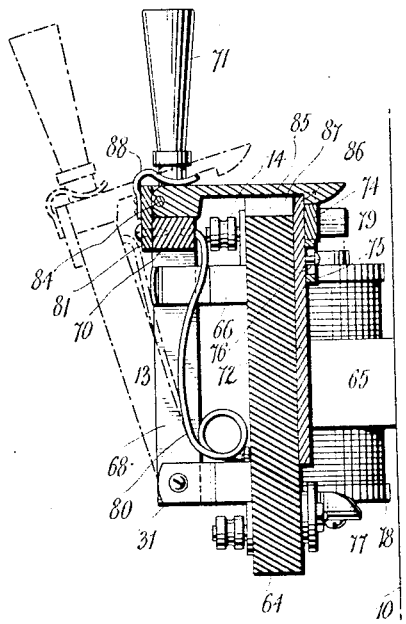
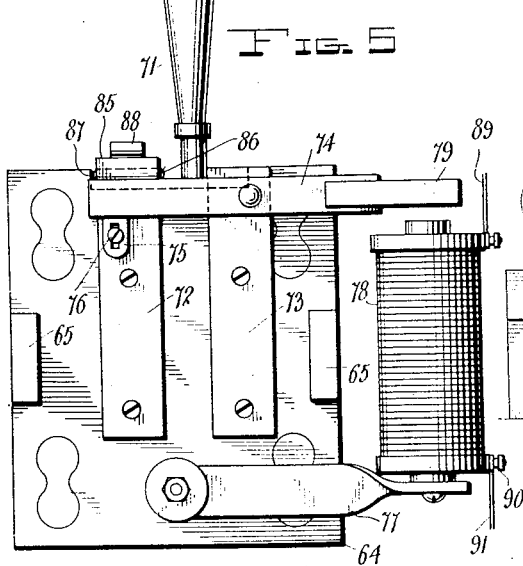
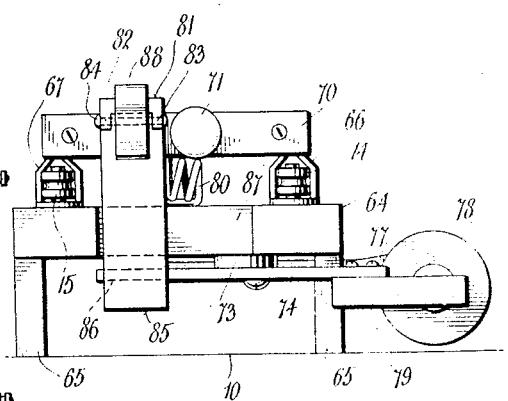

UNITED STATES PATENT OFFICE.

JOHN McFEELY, OF INDIANAPOLIS, INDIANA, ASSIGNOR OF THREE-FOURTHS TO MILTON E. PETTY AND HENRY E. PETTY, OF CHICAGO, ILLINOIS.

AUTOMATIC CONTROL AND SAFETY DEVICE FOR MOVING-PICTURE MACHINES.

1,084,651.  Specification of Letters Patent.  Patented Jan. 20, 1914.

Application filed May 23, 1911.  Serial No. 628,933.

*To all whom it may concern:*

Be it known that I, JOHN McFEELY, a citizen of the United States, residing at Indianapolis, in the county of Marion, State of Indiana, have invented certain new and useful Improvements in Automatic Control and Safety Devices for Moving-Picture Machines; and I do hereby declare the following to be a full, clear, and exact description of the invention, such as will enable others skilled in the art to which it appertains to make and use the same.

My invention relates to new and useful improvements in automatic switch governors and more especially to that class of switch governors adapted for use with projectors for moving pictures, and the object of my invention is to improve the construction and increase the efficiency of devices of the above described character.

A further object of my invention is to provide a switch operating mechanism which will be automatically actuated by the films, in such a manner that any breaking of the film, or any marked decrease in the speed thereof will immediately actuate the same to throw the switch.

A still further object is to provide means by which the opening of the switch will both stop the film mechanism and also extinguish the light, thereby absolutely preventing all danger of setting fire to the film by means of the light and also preventing the film, if broken, from being further injured.

With these and other objects in view my invention will be more fully described, illustrated in the accompanying drawings, and then specifically pointed out in the claims which are attached to and form a part of this application.

In the drawings which illustrate a preferred embodiment of my invention, Figure 1 is a side elevation partly diagrammatic of a conventional form of moving picture projector, showing my invention applied thereto. Fig. 2 is a rear elevation of the switch operating mechanism. Fig. 3 is a top plan view of the same. Fig. 4 is a top plan view of the particular form of switch used. Fig. 5 is a bottom plan view of the same. Fig. 6 is a front elevation of the switch, and Fig. 7 is a longitudinal section through the line 7—7 of Fig. 4.

Referring more specifically to the drawings, in which similar reference numerals designate corresponding parts throughout, 1 designates in general the supporting frame of the machine, 2 and 3 the lower and upper film reel casings, 4 the projector itself having a lens 5, and 6 the film. Positioned behind these in the customary well known manner, is the arc-light 7 consisting primarily of the upper and lower carbons 8 and 9 respectively.

For the sake of convenience and clearness I have illustrated the wiring and switch board diagrammatically, the latter being designated in general by the numeral 10. Mounted upon the switch board are the double knife switches 11, 12 and 13, all of which are of the usual or any preferred type with the exception that the switch 13 is also provided with a spring catch and an electromagnet adapted to operate the same, the details of which will be hereinafter more fully explained. Connected to the binding posts 14 and 15 of the switch 13 are the feed or supply wires 16 and 17, by which the power is obtained both for operating the mechanism and for the light. Connected to the binding posts 18 and 19 are the wires 20 and 21 respectively the other ends of which are connected to a suitable form of motor, not shown, for actuating the film driving mechanism, and connected to the binding posts 22 and 23 of the switch 11 are the wires 24 and 25 the other ends of which are connected to the carbons 8 and 9 respectively of the arc lamp. A wire 26 connects the contact member 27 of the switch 13 with the contacts 28 and 29 respectively of the switches 12 and 11, while a wire 30 connects the contact 31 of the switch 13 with the contacts 32 and 33 respectively of the switches 12 and 11, said wire 30 being further extended and connected at its end to one of the contact members of the switch operating mechanism which as a whole is designated by the numeral 34.

The switch operating mechanism as best shown in Figs. 2 and 3 of the drawings consists of a supporting frame or base 35 upon which is rotatably mounted the shaft 36, said shaft being suitably journaled in bearings 37 and 38 carried by the side members of the frame. Keyed upon this shaft and adapted to rotate therewith is the spool shaped film roller 39 which as shown is of the customary type and provided with the teeth 40 adapted to engage with the slots 41 formed in the sides of the film. Extending upwardly upon either side of the frame are the guide ways 42 and 43 upon which are slidably mounted for vertical movement the bearings 44 and 45 in which is journaled a shaft 46 which carries an idle roller 47. Springs 48 and 49 connect the bearings 44 and 45 respectively with the frame, thus yieldably limiting the movement of the roller. The side members of the frame are further provided with a second pair of upwardly extending members 50 and 51, said members being positioned upon that side of the shaft 36 opposite to the members 42 and 43, and rotatably journaled in bearings 52 and 53 of these members is a second shaft 54. Keyed upon this shaft and adjacent one end thereof is a spur gear 55 and adjacent to this spur gear is a collar 56 which is also keyed upon the shaft and to which are secured the spring arms 57 of a centrifugal governor 58, the other ends of said arms being secured to the slidable collar 59 which collar, carries upon its outer face a contact disk 60 which, when the governor is at rest is in engagement with the contact brushes 61 and 62. Keyed upon the shaft 36 is a spur gear 63, said gear meshing with the spur gear 55 of the shaft 54 and it will be seen that the revolving of the shaft 36 will cause a corresponding rotation of the shaft 54 which, as will be readily understood will by means of the governor, draw the contact disk away from its engagement with the brushes 61 and 62.

In operation the above described mechanism is placed at any desired point in the path of the film, the film being passed over the roller 39, engaging with the teeth thereof, and then down under the roller 47, which by the tension of its spring, serves to maintain the film in operative engagement with the roller 39. It will be seen that any breaking of the film, or undue slowing up of the motion thereof will act through the spur gears 55 and 63 and the governor 58 to close the circuit between the contact disk and its brushes.

I will now describe the peculiar form of switch used in connection with my invention, said switch having been previously referred to as a whole by the numeral 13. As best shown in Figs. 4 to 7 of the drawings this switch consists of an insulating base 64 provided with downwardly extending legs 65 by which said base may be secured to and spaced apart from the switch board. Secured to the upper face of said base and adjacent the rear portion thereof are the contact members 66 and 67 which carry the before mentioned binding posts 27 and 31, and in which are also pivotally mounted the switch knives 68 and 69, the other ends of said knives being joined by the customary yoke 70 provided with the operating handle 71. Secured to the upper forward portion of the switch base are the customary spring contacts for engaging said knives when closed, these contacts having been previously designated by the numerals 14 and 15. Thus far the above described switch with the possible exception of the supporting legs of the base is identical in construction with the customary form of switches of this type.

Referring more specifically to Fig. 5 of the drawings it will be seen that I have added the metal plates 72 and 73 upon the forward end of one of which is pivotably mounted a metal bar 74, the swinging motion of which is adjustably limited in one direction, by the slotted stop 75 which is adjustably secured to the plate 72 by means of a screw 76, the forward end of the plate 72 terminating flush with the forward face of the base. Secured to the lower rear portion of the base and extending upwardly beyond the side thereof is a bracket member 77 which carries an electro-magnet 78, and the outer end of the swinging bar or arm 74 is provided at its end with the iron plate 79, said bar and plate being so positioned that when the said plate is drawn into an engagement with the magnet the inner end of the arm 74 will extend out flush with the forward face or edge of the plate 72. Secured by one end to the upper face of the base is the spring 80, the other end of which is secured in any preferred manner to the yoke 70 of the switch, said spring being adapted to maintain the switch at all times in open position. Secured to the upper face of the yoke 70 and extending forwardly beyond the same is a plate 81, the forward extension of which is provided with the spaced apart downwardly extending ears 82 and 83 between which is pivotally secured, by means of a rivet or other preferred means 84, a catch 85, the lower end of which is provided with the inwardly extending shoulder 86 adapted to engage with the forward end of the plate 72 when the switch is closed. As will be readily seen from the above this catch will hold the switch in closed position against the action of the spring until the electro-magnet is energized. Upon passing a current through the magnet the iron plate 79 is drawn thereto swinging the bar 74 and thus releasing the catch, when the spring immediately throws open the switch. In order to insure the engagement of the catch I have provided the front of the switch with a recess 87, thus preventing any interference by the base with the catch member of the switch.

As shown in Fig. 7 the upper forward edge of the plate 72 is beveled, as is the lower rear edge of the catch member thereby adapting the same for ready engagement with the catch. In order to cause the catch to automatically engage with the plate 72 I have provided the plate 81 with a spring 88 by means of which the catch will of itself engage with the plate 72.

Referring to the diagrammatic view in Fig. 1 it will be seen that one of the binding posts of the electromagnet is connected by a wire 89 to the contact 27 of the switch 13, while the other binding post 90 of the magnet is connected by a wire 91 to the contact brush 61 of the switch actuating mechanism 34. As previously described a wire 30 is connected between the contact 31 of the switch 13 and the contact brush 62 of the switch operating mechanism. As will be readily understood since the entire current in operating the projector is supplied through the switch 13, the opening of the switch 13 will both stop the motor and extinguish the light, thus avoiding all damage by fire to the film, and preventing the same if broken from becoming further torn. It will also be seen from Fig. 1 of the drawings that the electro-magnet 78 is normally connected in open circuit with the switch operating mechanism 34, said circuit being opened by the gap between the brush contacts 61 and 62 and the contact disk 60, said disk being held away from the contact brushes by the action of the governor 58. Should the tension of the film be relieved however, either by breaking of the film or slowing down of the motor this circuit will be closed, thus energizing the magnet and throwing open the switch 13.

In starting the machine the magnet 78 may be rendered inoperative, either by holding away the iron plate or by holding away one of the brush contacts from the disk, or the switch itself may be held in position by hand until the film is traveling at a sufficient rate to allow the lock to operate, a choice of method depending upon the relative location of the switch and projector.

It will be readily understood from the above description that my device is absolutely automatic in its action and wholly controlled and actuated by the film itself.

Heretofore when anything happened to the projector it was necessary to immediately put out the light and stop the motor in order to protect the film from serious injury. The most frequent injury done to the machine and the hardest one to avoid has heretofore been the scorching, if not the burning of the film caused by running the machine too slowly. This was particularly hard to avoid because the shutting off of the light depended wholly upon the discretion and experience of the operator. With my attachment the governor may be adjusted to throw the switch at any desired speed of the film thus leaving nothing to the discretion of the operator.

What I claim is:—

1. In a moving picture apparatus, the combination of a traveling film, mechanism for moving said film, an arc light for the film, and means, including a speed governor, driven by the film and governed by the speed of the latter for simultaneously extinguishing the light and stopping the film moving mechanism.

2. In a moving picture apparatus, the combination with a traveling film, electrically operated actuating mechanism for said film and an arc light for the film and an electric circuit for said actuating mechanism and light, a main circuit breaker in said circuit and a circuit closer, including a speed governor actuated by the film and controlled by the speed of the film for actuating the circuit breaker to open the circuit and stop the film actuating means and extinguish the light.

3. In a moving picture apparatus, the combination with a traveling film, an arc light therefor, and a motor for actuating said film, of a circuit for supplying power to both the light and motor, a main switch located in the circuit, an electromagnet, a releasing device for the main switch also constituting an armature for the electromagnet, and means, including a switch and a speed governor for actuating said switch and driven by the film and controlled by the speed of such film for automatically energizing the electromagnet to attract the armature and release the main switch to simultaneously cut out the light and motor.

In testimony whereof, I affix my signature, in presence of two witnesses.

JOHN McFEELY.

Witnesses:
ERNEST V. MILL,
GUY R. LINDAMOOD.